F. M. MARSHALL.
Seed-Planter.
No. 22,438. Patented Dec. 28. 1858.
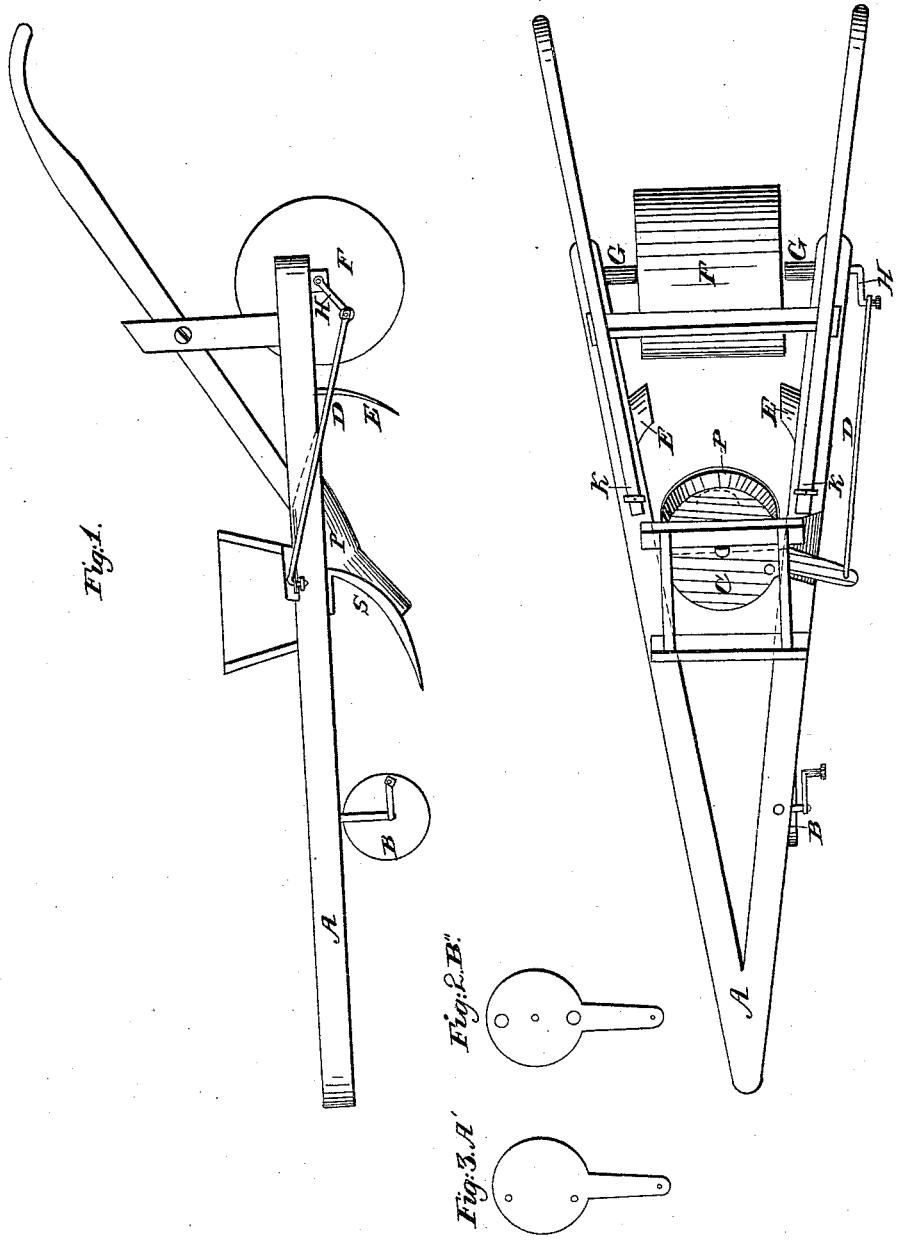

UNITED STATES PATENT OFFICE.

F. M. MARSHALL, OF SEGUIN, TEXAS.

IMPROVEMENT IN SEED-PLANTERS.

Specification forming part of Letters Patent No. 22,438, dated December 28, 1858.

*To all whom it may concern:*

Be it known that I, FRANK M. MARSHALL, of Seguin, in the county of Guadalupe, State of Texas, have invented a new and Improved Corn and Cotton Planter; and I do hereby declare that the following is a full and exact description thereof, reference being had to the accompanying drawings, and to the letters of reference marked thereon.

The said machine and invention consists of a beam (marked A in the drawing hereto attached) four and one-half feet in length. At one and three-fourths foot from the front is attached, underneath, a gage-wheel (marked B) nine inches in diameter. The object of this wheel is to regulate the depth of the furrow made by the plow, said wheel being movable, and being raised or lowered by the screw and tap connecting it with the beam. At one and three-fourths foot from the said gage-wheel—to wit, at C—is placed within the center of the beam aforesaid a circular perforated plate seven (7) inches in diameter, which has a back-and-forth action of about one-sixth of its circumference. One-half of said plate is located directly under the hopper, the other half behind it. Directly under the said plate is placed the improved wrought-iron bull-tongue plow S, back of and adjoining which is situated a wide-mouthed funnel, T, which conducts the seed from the hopper through the plate aforesaid to the bottom of the furrow at the point of the plow. From the perforated plate aforesaid the beam is forked, having on each prong, about a foot from the hopper, a covering-shear, (marked E E,) which is constructed of wrought-iron. The object of these covering-shears is to throw the dirt over the center of the furrow made by the plow. At the hindermost end of the beam aforesaid, and in the prongs of the beam, is situated a roller (marked F) twelve (12) inches in diameter and twelve (12) inches long, which works upon the axle G G, fixed in the prongs of the beam. Outside of the prongs of the said beam, on the left side, is placed an iron pitman, connecting the roller F by a crank, H, to an arm, D, attached to the circular perforated plate A or B. To the machine belong two perforated circular plates, which are movable.

For cotton-planting the plate B″, Fig. 2, is inserted in the bottom of the hopper aforesaid, the holes in said plate being about one and one-quarter inch in diameter. Plate A′, Fig. 3, perforated with smaller holes about one-half inch in diameter, is inserted for corn-planting. At K are attached the two handles. The holes in the seed-plates A′ B″ pass directly under the back part of the hopper.

Having described my invention, what I claim as new, and desire to secure by Letters Patent, is—

The arrangement of perforated plates A′ and B″, beam A, gage-wheel B, bull-tongue plow S, roller F, crank H, arm D, and handles K K, the whole being constructed for joint operation, as set forth and described.

F. M. MARSHALL.

Witnesses:
 T. M. LOGAN,
 J. W. BELL.